US012759618B2

(12) United States Patent
Lee et al.

(10) Patent No.: US 12,759,618 B2
(45) Date of Patent: Oct. 13, 2026

(54) CONTROL DEVICE AND CONTROL METHOD OF ELECTRIC POWER STEERING SYSTEM

(71) Applicant: HL MANDO CORPORATION, Gyeonggi-do (KR)

(72) Inventors: Su Min Lee, Gyeonggi-do (KR); Kyu Yeong Je, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/918,127

(22) Filed: Oct. 17, 2024

(65) Prior Publication Data

US 2025/0162646 A1 May 22, 2025

(30) Foreign Application Priority Data

Nov. 20, 2023 (KR) ........................ 10-2023-0161617

(51) Int. Cl.
*B62D 5/04* (2006.01)
*B62D 5/00* (2006.01)
*H02P 27/06* (2006.01)

(52) U.S. Cl.
CPC ............. *B62D 5/046* (2013.01); *B62D 5/001* (2013.01); *B62D 5/0409* (2013.01); *H02P 27/06* (2013.01)

(58) Field of Classification Search
CPC ...... B62D 5/046; B62D 5/001; B62D 5/0409; B62D 5/006; B62D 5/0481; B60R 16/03; B60R 16/033; H02P 27/06
USPC ......................................... 701/41, 42, 43, 44
See application file for complete search history.

(56) References Cited

U.S. PATENT DOCUMENTS

| | | | |
|---|---|---|---|
| 8,967,321 | B2 | 3/2015 | Banno et al. |
| 10,697,802 | B2 | 6/2020 | Coceani et al. |
| 11,909,254 | B2 | 2/2024 | Neveri |
| 11,975,776 | B2 | 5/2024 | Lee |

(Continued)

FOREIGN PATENT DOCUMENTS

| | | |
|---|---|---|
| DE | 10 2014 210 245 | 12/2014 |
| DE | 10 2019 112 429 | 11/2019 |

(Continued)

OTHER PUBLICATIONS

Office Action dated Aug. 21, 2026 for Germany Patent Application No. 10 2024 209 962.7 and its English translation provided by Applicant's foreign counsel.

(Continued)

*Primary Examiner* — Hai H Huynh
(74) *Attorney, Agent, or Firm* — WOMBLE BOND DICKINSON (US) LLP

(57) ABSTRACT

The present embodiments relate to a control device and method for an electric power steering (EPS) system, and an EPS system including the same. A control device according to an embodiment may include a steering controller configured to control a rotation of a motor linked to a steering wheel or a wheel of a vehicle, and a wake-up circuit configured to, in an ignition-off state of a vehicle, wake up the steering controller using a change in current consumption of a motor rotation detection element due to forced rotation of the motor by external force, wherein the steering controller may apply a reaction torque to the motor to suppress the forced rotation of the motor after waking up.

18 Claims, 9 Drawing Sheets

(56) References Cited

U.S. PATENT DOCUMENTS

| | | | | |
|---|---|---|---|---|
| 12,049,269 | B2 | 7/2024 | Kim | |
| 2023/0026250 | A1* | 1/2023 | Kajisawa | B62D 5/006 |
| 2024/0149939 | A1* | 5/2024 | Kim | B62D 5/001 |
| 2025/0153766 | A1* | 5/2025 | Lee | B62D 5/0475 |

FOREIGN PATENT DOCUMENTS

| | | | | | |
|---|---|---|---|---|---|
| DE | 10 2019 203 111 | | | 9/2020 | |
| DE | 10 2022 209 149 | | | 6/2023 | |
| DE | 102023113520 | A1 | * | 5/2024 | H02P 29/40 |
| KR | 10-2023-0007742 | | | 1/2023 | |
| KR | 20230088081 | A | * | 6/2023 | B62D 5/04 |
| WO | 2014/148087 | | | 9/2014 | |

OTHER PUBLICATIONS

Allegrro MicroSystems, LLC., "Precision, Hall-Effect Angle Sensor IC with SPI, and SENT or PWM Outputs", A1337, dated Apr. 4, 2018.
Autosar., "Specification of ECU State Manager with fixed state machine." Autosar CP Release 4.3.1, dated Dec. 8, 2017.
Office Action dated Aug. 21, 2026 for Korean Patent Application No. 10-2023-0161617 and its English translation provided by Applicant's foreign counsel.

* cited by examiner

CONTROL DEVICE AND CONTROL METHOD OF ELECTRIC POWER STEERING SYSTEM

CROSS REFERENCE TO RELATED APPLICATION

This application claims priority from Korean Patent Application No. 10-2023-0161617, filed on Nov. 20, 2023, which is hereby incorporated by reference for all purposes as if fully set forth herein.

TECHNICAL FIELD

An embodiment of the present disclosure relates to a control device and a control method of an electric power steering (EPS; may be abbreviated as "EPS" hereinafter) system, and an electric power steering system including the same. More specifically, the embodiments of the present disclosure relate to a control device and method capable of waking up an electronic control unit (ECU) by motor rotation in an EPS system of a steer-by-wire (SBW) type and suppressing rapid steering of the steering wheel.

BACKGROUND

A steering device or a steering system is used as a device for controlling the travelling direction of a vehicle. Recently, there is widely utilized an electric power steering (EPS) system in which a steering motor provides necessary steering force by electronic control.

The EPS system or a EPS device may operate to rotate a steering shaft of a steering column or move a rack bar connected thereto by driving a steering motor according to a steering torque applied to a steering wheel by a driver.

As an example of such an EPS system, there is an SBW steering system that is an EPS system of a steer-by-wire (SBW) type.

The SBW steering system may include a structure that removes a mechanical coupling device such as a steering column, a universal joint, or a pinion shaft between a steering wheel and a wheel of a vehicle.

The SBW steering system may generally include an upper device and a lower device mechanically separated from each other, and a control circuit for controlling the upper device and the lower device.

In the case of the SBW steering system, since the upper device connected to a steering wheel and the lower device connected to a rack bar are mechanically separated, even if a reaction force motor or a steering motor is turned off due to a vehicle ignition-off, a steering wheel interlocked therewith may rotate or a wheel may be steered.

That is, even if the reaction force motor of the upper device is turned off due to the vehicle ignition-off, since the steering wheel and steering column are separated from the lower device, the steering wheel may rotate arbitrarily.

In addition, even if the steering motor of the lower device is turned off due to the vehicle ignition-off, the rack bar linked thereto may move left and right, and thus the wheels may be arbitrarily steered.

Accordingly, in the SBW steering system, there may be further required a locking device for forcibly locking the reaction force motor or the steering motor in the case of the vehicle ignition-off.

A locking device may be implemented as a part of the steering control circuit included in the SBW steering system, and may have a configuration in which a rotation of a three-phase motor is prevented by shorting the multi-phase windings of the steering motor to the same potential in the case of a condition requiring motor restraint.

That is, in a locking condition such as a case of vehicle ignition-off, the locking circuit may operate to prevent rotation of the reaction motor or steering motor, thereby preventing rotation of the steering wheel.

In the case of using such a locking circuit, there is a disadvantage that power consumption occurs since the locking circuit is required to operate even when the vehicle ignition is off and a power source therefor is required.

In addition, a control device of the EPS may be complicated since a separate locking circuit is required to be provided.

Therefore, there is required a simple and low-power device to restrain the rotation of a steering wheel of an EPS in the case of the vehicle ignition-off.

SUMMARY

In this background, embodiments of the present disclosure are to provide a control device and method of an EPS system capable of restraining the rotation of the steering wheel or an arbitrary steering of a wheel of a vehicle when the vehicle's ignition is off in the electric steering system of a vehicle, and an electric power steering system including the same.

Embodiments of the present disclosure is to provide a control device and method of an EPS system capable of, in the state of the vehicle ignition-off, restricting the rotation of the steering wheel or an arbitrary steering of a wheel of a vehicle using a changes in current consumption of a motor rotation detection element included in the electric power steering system, and an electric power steering system including the same.

Embodiments of the present disclosure is to provide a control device and method of an EPS system capable of, in the state of the vehicle ignition-off, waking up an electronic control unit using a changes in current consumption of a motor rotation detection element due to forced rotation of a motor included in the steering system, and an electric power steering system including the same.

In accordance with an aspect of the present disclosure, there may be provided a control device of an electric power steering system including a steering controller configured to control a rotation of a motor linked to a steering wheel or a wheel of a vehicle, and a wake-up circuit configured to, in an ignition-off state of a vehicle, wake up the steering controller using a change in current consumption of a motor rotation detection element due to forced rotation of the motor by external force, wherein the steering controller is configured to apply a reaction torque to the motor to suppress the forced rotation of the motor after waking up.

The motor rotation detection element may generate a first consumption current if the motor is not rotating, and generate a second consumption current greater than the first consumption current when the motor is rotating.

In addition, the wake-up circuit may include one or more switching elements and one or more resistance elements connected between a power supply and the motor rotation detection element.

Specifically, the resistance element of the wake-up circuit may include a first resistor connected to the power supply and a second resistor connected between the first resistor and the motor rotation detection element, In addition, the switching element of the wake-up circuit may include a source terminal connected to a first node between the power supply and the first resistor, a gate terminal connected to a second node between the first resistor and the second resistor, and a drain terminal connected to the steering controller.

In this case, in the case that the second consumption current is generated, a voltage difference between both ends of the first resistor may be greater than a turn-on threshold voltage of the switching element.

The steering controller may include a regulator configured to regulate a voltage from the power supply, an inverter configured to supply control current to windings included in the motor, a gate driver configured to control an operation of the inverter, and a micro-control unit (MCU) configured to be driven by a driving voltage supplied from the regulator and control an operation of the gate driver.

In the case that the second consumption current is generated, a wake-up signal may be transmitted from the drain terminal of the switching element to an enable terminal of the regulator.

In addition, the wake-up circuit may further include a third resistor disposed between the drain terminal of the switching element and the enable terminal of the regulator, and a fourth resistor connected between the enable terminal and one end of the third resistor and ground.

Meanwhile, after waking up, the steering controller may determine a non-driving state of the vehicle based on vehicle status information received from a sensor, and apply the reaction torque to the motor only in the case of the non-driving state.

In this case, the vehicle status information may include at least one of vehicle ignition information, vehicle speed information, vehicle door lock information, vehicle door open information, driver boarding information, seat belt fastening information, and theft alarm function activation information.

Meanwhile, the electric power steering system may be a steer-by-wire steering system which comprises an upper device including a reaction motor linked to the steering wheel, and a lower device mechanically separate from the upper device and including a steering driving motor linked to the wheel of the vehicle.

In this case, and the motor linked to the steering wheel may be the reaction motor included in the upper device.

In addition, after waking the steering controller may provide the reaction torque to the motor for a specific holding time and then turns off or enters a sleep mode. In this case, the holding time may be set to a time period between 2 and 5 seconds.

As an example, the motor rotation detection element may be a motor position sensor connected to the motor and having a function of measuring a rotation speed of a rotor of the motor.

In accordance with another aspect of the present disclosure, there may be provided a control method of an electric power steering system including waking up, by a wake-up circuit, in an ignition-off state of a vehicle, a steering controller using a change in current consumption of a motor rotation detection element due to forced rotation of a motor linked to a steering wheel or a wheel of the vehicle by external force, and generating and applying, by the steering controller woke up, a reaction torque to the motor to suppress the forced rotation of the motor.

In accordance with another aspect of the present disclosure, there may be provided an electric power steering system including a motor linked to a steering wheel or a wheel of a vehicle, a steering controller configured to control a rotation of the motor, and a wake-up circuit configured to, in an ignition-off state of a vehicle, wake up the steering controller using a change in current consumption of a motor rotation detection element due to forced rotation of the motor by external force, wherein the steering controller is configured to apply a reaction torque to the motor to suppress the forced rotation of the motor after waking up.

The electric power steering system may be a steer-by-wire steering system which comprises an upper device including a reaction motor linked to the steering wheel, and a lower device mechanically separate from the upper device and including a steering driving motor linked to the wheel of the vehicle. In this case, and the motor linked to the steering wheel may be the reaction motor included in the upper device.

The wake-up circuit may include a first resistor connected to a power supply and a second resistor connected between the first resistor and the motor rotation detection element, and a switching element including a source terminal connected to a first node between the power supply and the first resistor, a gate terminal connected to a second node between the first resistor and the second resistor, and a drain terminal connected to the steering controller.

As will be explained below, according to an embodiment of the present disclosure, it is possible to restrict the rotation of the steering wheel and a random steering of the wheels under a condition of the vehicle ignition-off.

In addition, according to an embodiment of the present disclosure, it is possible to, in the vehicle ignition-off state, suppress the rotation of the steering wheel or a random steering of the wheels by using a change in current consumption of a motor rotation detection element due to forced rotation of a motor included in the electric steering system.

In addition, according to an embodiment of the present disclosure, it is possible to, in the vehicle ignition-off state, wake up an electronic controller using a change in current consumption of a motor rotation detection element due to forced rotation of a motor included in the electric steering system, and control the electronic controller to provide a reaction force to the motor to constrain the rotation of the steering wheel or a random steering of the wheels.

Therefore, according to embodiments of the present disclosure, it is possible to prevent the random rotation of the steering wheel or a random steering of the wheels in a vehicle ignition-off state, thereby preventing vehicle theft and maintaining vehicle stability.

DETAILED DESCRIPTION

Figure 1:
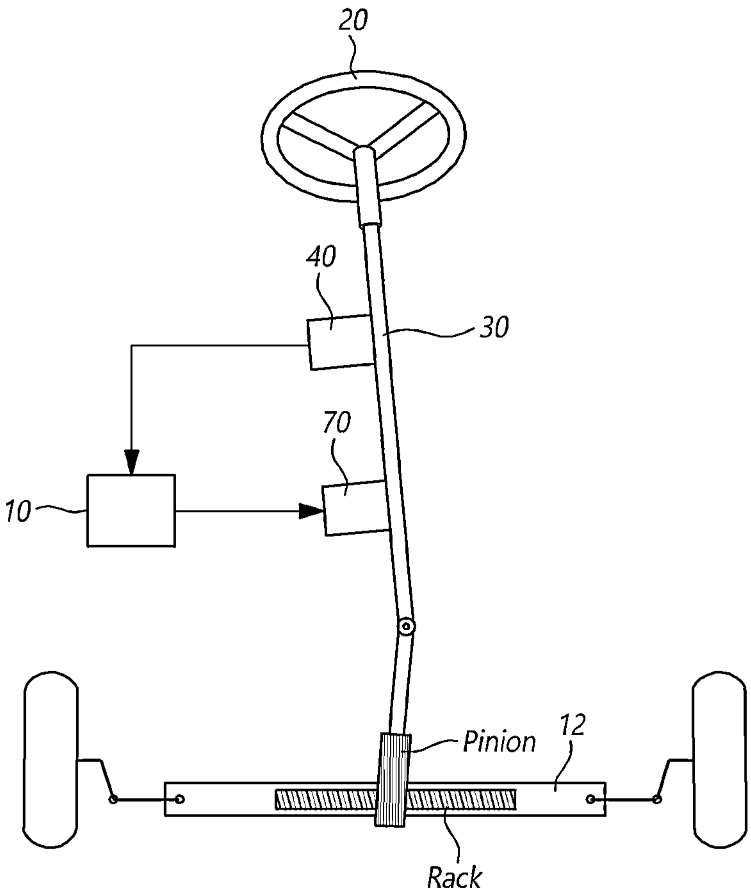
FIG. 1 illustrates an example of a schematic configuration of an electric power steering system.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” may be used herein to describe elements of the disclosure. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element may be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms may be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can”.

FIG. 1 illustrates an example of a schematic configuration of an electric power steering system.

A steering device or steering system may be used as a device for controlling the driving direction of a vehicle, and recently, there is widely used an electric power steering (EPS) system in which a steering motor provides necessary steering force by electronic control.

An EPS system or EPS device may operate to rotate a steering column or move a rack bar connected thereto by driving an EPS steering motor according to a steering torque applied to a steering wheel by a driver.

An EPS system in which a steering motor rotates a steering column may be expressed as a column-type EPS system or a C-type EPS system. In the C-type EPS system, a steering column may be connected with a universal joint and a pinion gear, and the pinion gear may be coupled with a rack gear of a rack bar connected to a wheel of a vehicle.

FIG. 1 illustrates a C-type EPS system, and the C-type EPS system may include a steering column 30 connected to a steering wheel 20, a sensor unit 40 installed on the steering column, a steering motor 70 for rotating a steering column, and an electronic control unit (ECU) 10 as a steering controller or steering control circuit for controlling the steering motor. A specific reducer may be connected to the steering motor, and the reducer may be interlocked between the steering column and the steering motor.

The steering column 30 may be coupled to the steering wheel 20 and may be rotated together with the steering wheel 20. The shape of the steering column 30 may be cylindrical.

Although not shown, the steering column 30 may be interlocked with one or more reducers, and any one of a plurality of reducers may be coupled to an outer circumferential surface of the steering column 30.

The sensor unit 40 may include a steering angle sensor, a torque sensor, and a vehicle speed sensor.

The steering angle sensor may detect a steering angle generated by rotation of the steering wheel 20. In addition, the steering angle sensor 40 may output a steering angle signal indicating information on the steering angle.

The torque sensor may detect steering torque generated by rotation of the steering wheel 20. In addition, if the steering torque is detected, the torque sensor may output a steering torque signal indicating information on the steering torque.

Here, the steering torque may mean rotational torque acting on a torsion bar existing between an input shaft and an output shaft of the steering column 30. Therefore, steering torque may be detected even if the steering wheel 20 is not rotating.

The vehicle speed sensor may detect a speed of a vehicle and output a vehicle speed signal indicating information on the vehicle speed.

The steering controller or ECU 10 may receive steering information, calculate a target rack position for providing a steering assist force based on the steering information, and output a command current corresponding to the rack position to the steering motor 70. Here, the steering information may include one or more of a steering angle signal output by a steering angle sensor, a steering torque signal output by a torque sensor, and a vehicle speed signal output by a speed sensor.

The ECU 10 may be implemented with hardware and software including a micro controller unit (MCU), an inverter, a printed circuit board (PCB), and the like.

The steering motor 70 may receive a command current from the ECU 10 and be driven at torque and rotational speed according to the command current. Although not shown, the steering motor 70 may be coupled with a reducer disposed on the steering column 30. Rotation of the steering motor 70 may rotate the reducer interlocked with the steering column 30 and the steering column.

Meanwhile, the steering column may be rotated by the rotation of the steering motor 70, and accordingly, the rack bar linked to the pinion gear at the output end of the steering column may move left and right.

Accordingly, the vehicle may be steered by moving wheels connected to both ends of the rack bar to the left or right.

The steering motor 70 included in the C-type EPS system may be a three-phase motor, but is not limited thereto.

The ECU 10 may perform a function of receiving power from a power supply unit (not shown), generating a target current to be supplied to each winding of the steering motor using an inverter, and supplying the target current to the steering motor.

In the C-type EPS system, when the steering motor 70 rotates the steering column 30 to apply steering assist force, the steering assist force may be transmitted to the rack bar 12 through the pinion-rack gear. As the rack bar moves left and right, the wheels connected thereto may be steered left and right.

Meanwhile, an EPS system in which a steering motor directly moves a rack bar connected to a wheel may be referred as a rack-type EPS system or an R-type EPS system.

In the R-type EPS system, the steering motor and the rack bar may be connected by a belt or gear, and a reducer such as a ball nut is linked therebetween. As the steering motor rotates, the ball nut reducer linked to the rack bar rotates, and the rack bar may move left and right according to the rotation of the reducer to steer the wheels.

Figure 2:
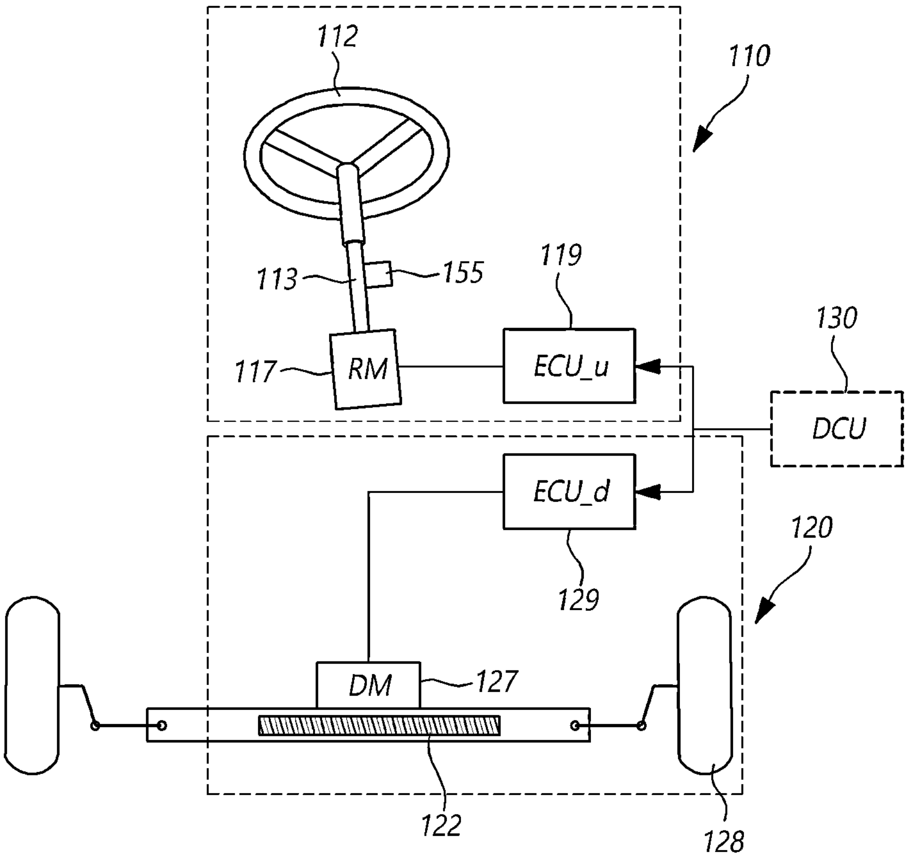
FIG. 2 illustrates a schematic configuration of a SBW steering system to which the embodiments can be applied.

FIG. 2 illustrates a schematic configuration of a SBW steering system to which the embodiments can be applied.

As an example of the EPS system, there is an SBW steering system that is an EPS system of a steer-by-wire (SBW) type.

The SBW steering system may include a structure in which the mechanical coupling devices such as a steering column, a universal joint, or a pinion shaft between a steering wheel and a wheel are removed.

Referring to FIG. 2, the SBW steering system to which an embodiment of the present disclosure can be applied may include an upper device 110 and a lower device 120 that are mechanically separated from each other, and a control device 130 for controlling the upper device 110 and a lower device 120.

The upper device 110 may include a steering wheel 112, a steering column 113 connected to the steering wheel, a torque sensor 155 for detecting torque applied to the steering wheel, a reaction force motor 117 as a motor device for providing reaction force torque to the steering wheel according to steering through a lower rack bar, and an upper ECU 119 for controlling the reaction force motor. This upper device 110 may be referred as a steering feedback actuator (SFA).

In addition, the lower device 120 may include a rack bar 122 connected to a wheel 128 of a vehicle, a steering driving motor 127 for moving the rack bar left and right, and a lower ECU 129 for controlling the steering driving motor.

The lower ECU 129 of the lower device 120 may generate a steering assist torque signal proportional to the steering torque applied to the steering wheel, and generate a driving signal for moving a rack bar connected to a tie rod of a wheel to the left and right by using a steering assist torque signal.

The lower device 120 may control the steering driving motor through a ball nut reducer based on the driving signal. The lower device may be referred as a road wheel actuator (RWA).

That is, in the SBW steering system, the upper device including a steering wheel, a steering column and a reaction force motor and the lower device including a rack bar driving device (i.e., a pinion gear, a ball nut and a steering driving motor) may operate independently without intermediate mechanical connection.

Therefore, in order to provide a driver with steering feeling, there is required to rotate the steering wheel connected to the upper device according to the movement of the rack bar of the lower device where actual steering is performed. In this case, the force or torque applied to the steering wheel may be defined as reaction force or reaction force torque.

Meanwhile, the steering system is required to not operate when the engine of the vehicle is turned off or in the case of the vehicle ignition-off.

That is, if the steering wheel is rotated in a state in which the vehicle engine is turned off or the vehicle ignition is off to allow the wheels to rotate, there may occur a problem in which the wheels of a stopped or parked vehicle are arbitrarily steered.

Accordingly, if the steering wheel rotates in a state of the vehicle ignition-off, the vehicle can be steered, which may make vehicle theft easier and reduce the stability of the parked vehicle.

Therefore, the steering wheel is required to be locked when the engine of the vehicle is turned off or in the case of the vehicle ignition-off.

Meanwhile, in the C-type EPS system or R-type EPS system, even if the steering motor is turned off due to the vehicle ignition-off, the steering wheel may be automatically locked since the mechanical structures such as a steering column, a rack bar, and a reducer are interlocked between the steering wheel and the wheel.

However, in the case of the SBW steering system, the upper device connected to the steering wheel and the lower device connected to the rack bar are mechanically separated. Therefore, even if the reaction force motor or steering motor is turned off due to the vehicle ignition-off, the steering wheel linked to the upper device may rotate or a vehicle wheel linked to the lower device may be steered.

That is, even if the reaction force motor of the upper device is turned off due to the vehicle ignition-off, since the steering wheel and steering column are separated from the lower device, the steering wheel may rotate arbitrarily.

In addition, even if the steering motor of the lower device is turned off due to the vehicle ignition-off, the rack bar linked thereto can move left and right, so that the vehicle wheels may be arbitrarily steered.

That is, unlike the C-type EPS system or R-type EPS system, in the case of the SBW steering system, it is necessary to separately implement a locking function that restricts the rotation of the steering wheel or the movement of the rack bar in the case of the vehicle ignition-off.

Accordingly, the SBW steering system is required to have a locking device forcibly locking the reaction force motor or the steering motor in the case of the vehicle ignition-off.

As an example of such a locking device, a separate clutch device may be provided to mechanically connect the upper device and the lower device.

As another example of the locking device, there may be provided a key lock solenoid device for locking the steering column in the case of the vehicle ignition-off.

As another example of a locking device, there may be used a locking device including a locking circuit for limiting the motor rotation. In this case, power may be supplied to the locking circuit regardless of the vehicle ignition-off, and the locking circuit may prevent the motor from rotating by short-circuiting the windings of the motor.

In general, a motor used in a steering system may be a three-phase motor including u-phase, v-phase, and w-phase and corresponding u-phase coils, v-phase coils, and w-phase coils.

In the case of such a three-phase motor, if an input terminal of each phase coil is floating, the three-phase motor may rotate arbitrarily.

Therefore, in the case of the vehicle ignition-off, the input terminal of the three-phase steering motor included in the EPS system, particularly the SBW steering motor, may be floated, and steering rotates arbitrarily the motor accordingly, resulting in problems with vehicle stability.

Therefore, there may be provided a locking circuit capable of preventing motor rotation by shorting an input terminal to a three-phase coil of a reaction force motor or steering motor included in the SBW steering system to the same potential in the case of the vehicle ignition-off.

Meanwhile, an EPS system including the SBW steering system may include a steering control circuit for controlling a steering motor.

Specifically, in order to drive/control the steering motor, a SBW steering controller may include a power supply unit and a steering control circuit to supply driving current to the steering motor.

The steering control circuit may also be expressed as a steering controller, a steering ECU, and the like.

In general, the steering control circuit included in the EPS system may include an inverter composed of a plurality of switching devices or switching elements, and an inverter driving circuit or a gate driving circuit for controlling the inverter.

In particular, the steering control circuit included in the SBW steering system may include, in addition to the inverter and the inverter driving circuit (or gate driving circuit), a locking circuit for preventing rotation of the steering motor or reaction force motor in the case of the vehicle ignition-off, as described above.

Such a locking circuit may be turned on by a locking signal provided from the steering controller in the state of the vehicle ignition-off, and may prevent rotation of the motor by short-circuiting the multi-phase winding of the reaction motor or steering motor.

The locking circuit is required to operate when the vehicle ignition is off, and therefore there may have the disadvantage that power for operating the locking circuit is consumed even if the vehicle ignition is off.

In addition, since a separate locking circuit ire required to be provided, the steering control device of the electric steering system may be complicated.

Therefore, hereinafter, there is proposed a steering control device which is simple and can operate with low power consumption to restrict the rotation of the EPS steering wheel in the case of the vehicle ignition-off.

Figure 3:
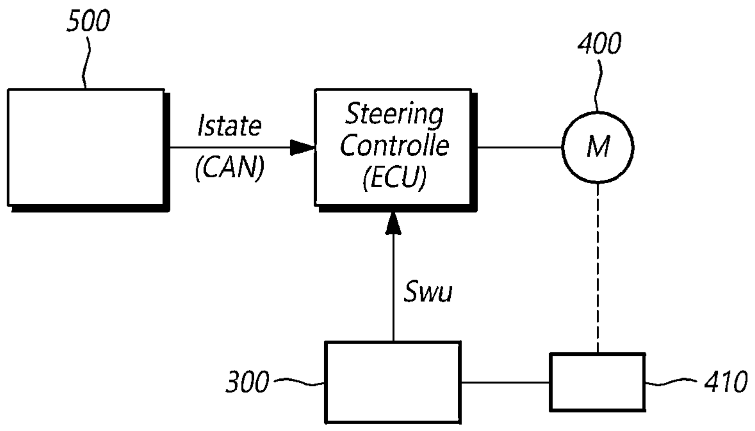
FIG. 3 illustrates a functional block diagram of a steering control device according to an embodiment.

FIG. 3 illustrates a functional block diagram of a steering control device according to an embodiment.

Referring to FIG. 3, a steering control device according to an embodiment may include a steering controller 200 which controls the rotation of a motor 400 linked to a steering wheel or a wheel of a vehicle, and a wake-up circuit 300 which wakes up the steering controller using a change in current consumption of a motor rotation detection element 410 linked to the motor 400.

The wake-up circuit 300 may wake up the steering controller using a change in current consumption of a motor rotation detection element due to the forced rotation of the motor by an external force in a vehicle ignition-off state.

As an example, the wake-up circuit 300 may include a switching element which turns on according to a change in current consumption of the motor rotation detection element 410 and one or more resistance elements.

Specifically, the wake-up circuit 300 may operate if the current consumption of the motor rotation detection element 410 changes from a first consumption current to a second consumption current according to the forced rotation of the motor 400 in the vehicle ignition-off state, and may wake up the steering controller 200 which is in turn-off or sleep mode.

An example of the detailed configuration of the wake-up circuit 300 will be described in more detail below with reference to FIGS. 5 to 7.

The motor rotation detection element 410 used in an embodiment may be a sensor equipped with an electronic turn count (ETC) function of counting the number of rotations of a rotor of the motor.

As an example, the motor rotation detection element 410 may be one of an electronic turn count sensor or a motor position sensor (MPS) having an electronic turn count function.

In addition, the steering controller 200 may determine a non-driving state of a vehicle based on the vehicle status information I_state received from a sensor 500 after waking up.

In this case, the steering controller 200 may apply the reaction torque to the motor 400 only if it is determined that the vehicle is in the non-driving state.

In this case, the vehicle status information may include at least one of vehicle ignition information, vehicle speed information, vehicle door lock information, vehicle door open information, driver boarding information, seat belt fastening information, and theft alarm function activation information.

Accordingly, the sensor 500 may include a vehicle ignition detection sensor, a vehicle speed sensor, a vehicle door sensor, a weight detection sensor or image sensor for detecting driver boarding, a seat belt fastening detection sensor, a theft alarm detection sensor, and so on.

The vehicle status information may be transmitted to the steering controller 200 through a vehicle controller area network (CAN) communication network connected to each sensor.

Specifically, the steering controller 200 may determine that the vehicle is in a non-driving state if at least one conditions among a condition in which vehicle ignition information indicates an ignition-off state, a condition in which vehicle speed information indicates a vehicle stopped state, and vehicle door lock information indicates a door lock locked state, a condition in which the vehicle door open information indicates that one or more of the vehicle doors are open, a condition in which the driver boarding information indicates that the driver or passenger is not inside the vehicle, a condition in which the seat belt fastening information indicates that the seat belt is not fastened, a condition indicating the theft alarm function activation information indicates the activation status of the vehicle anti-theft device inside the vehicle is satisfied.

As an example, after waking up, the steering controller 200 may generate reaction torque and apply the reaction torque to the motor only when the vehicle ignition is off and the vehicle is in the non-driving state.

As another example, the steering controller, which wakes up in the vehicle ignition-off state, may apply the reaction torque to the motor if the vehicle status information indicates that the vehicle is in the non-driving state, even if the vehicle is in a vehicle ignition-on state thereafter, thereby preventing the rotation of the steering wheel.

This is because that, for example, in the case that steering controller wakes up by a forced rotation of the steering wheel, it is required to limit the rotation of the steering wheel if the vehicle is in an abnormal driving state, such as a vehicle stopped state, a vehicle door open state, a vehicle door-lock locked state, an occupant absent state, a seat belt non-fasten state, an activation state of a vehicle anti-theft device, even if the vehicle is in a vehicle ignition-on state thereafter due to an attempt by an unqualified person to start the vehicle or an attempt to start the vehicle remotely.

In addition, according to an embodiment, the determination of the vehicle non-driving state and the application of reaction force torque may be performed only for a specific time period after the steering controller wakes up.

This is because, if the steering controller is woken up by forced rotation of the steering wheel, there is no need to determine the non-driving state and apply the reaction force torque after entering the normal vehicle ignition-on state and starting normal driving of the vehicle.

For example, if a legitimate driver forcibly rotates the steering wheel before turning on the vehicle ignition, there is no need to apply reaction torque even if the steering controller is woken up according to the embodiment, so it is possible to determine the non-driving state of the vehicle and apply reaction torque only for a specific threshold time period.

Meanwhile, the steering controller 200 according to the embodiment may include a regulator, an inverter, a gate driver, and a micro-control unit (MCU). A detailed configuration of the steering controller 200 is described in more detail below with reference to FIG. 4.

The electric power steering system including the steering control device according to the embodiment may be a general electric steering system, for example, a C-type EPS system, an R-type EPS system, etc. In this case, the motor may be a steering motor for rotating the steering column or rack bar to steer the wheels of the vehicle.

Alternatively, the steering control device according to the embodiment may be applied to a steer-by-wire (SBW) steering system.

In particular, the steering control device according to the embodiment may be applied to an upper device constituting the SBW steering system. In this case, the motor may be a reaction motor included in the upper device of the SBW steering system.

For example, the electric steering system according to an embodiment may be a steer-by-wire steering system including an upper device which includes a reaction motor linked to the steering wheel, and a lower device which is mechanically separated from the upper device and includes a steering driving motor linked to the wheel of the vehicle. In this case, the motor linked to the steering wheel may be the reaction motor included in the upper device.

In this case, the reaction torque may be a torque for rotating the reaction motor in a direction opposite to the forced rotation direction of the reaction motor.

More specifically, the SBW steering system including the steering control device according to an embodiment may, as shown in FIG. 2, include an upper device 110 and a lower device 120 that are mechanically separated from each other, and a control device 130 for controlling the upper device and the lower device. The control device 130 may be expressed as a domain control unit (DCU).

Specifically, the upper device 110 may include a steering wheel 112, a steering column 113 connected to the steering wheel, a torque sensor 115 for detecting torque applied to the steering wheel, a reaction motor 117 as a motor device to provide reaction torque to the steering wheel according to steering through the rack bar, and an upper ECU 119 for controlling the reaction motor.

In addition, the lower device 120 may include a rack bar 127 connected to a wheel 128, a steering driving motor 127 for moving the rack bar left and right, and a lower ECU 129.

The lower ECU 129 of the lower device 120 may generate a steering assistance torque signal proportional to the steering torque applied to the steering wheel, and use the steering assistance torque signal to generate a driving signal to move the rack bar connected to the tie-rod of the wheel left and right.

In particular, the steering control device according to the embodiment may be applied to the upper device 110 that constitutes the SBW steering system as shown in FIG. 2.

In this case, the motor 400 may be a reaction motor 117 included in the upper device 110 of the SBW steering system, and the steering controller 200 may be an upper ECU 119 included in the upper device 110 of the SBW steering system.

That is, the motor 400 and the steering controller 200 included in the steering control device shown in FIG. 3 may be the reaction motor 117 and the upper ECU 119 included in the upper device 110 of the SBW steering system shown in FIG. 2, respectively.

In this case, a motor rotation detection element for detecting rotation of the reaction motor 117 may be connected to the reaction motor 117. The wake-up circuit 300 may wake up the upper ECU 119 by operating based on the change in current consumption of the motor rotation detection element connected to the reaction motor 117 in the vehicle ignition-off state.

The woken upper ECU 119 may generate a reaction torque command signal which suppresses forced rotation of the reaction motor, and apply reaction torque to the reaction motor 117 based on the reaction torque command signal.

The present disclosure is not limited to this, and the control device according to an embodiment may be applied to the lower device 120 of the SBW steering system.

In this case, the motor 400 included in the steering control device shown in FIG. 3 may be the steering driving motor 127 included in the lower device 120 of the SBW steering system shown in FIG. 2.

In this case, a motor rotation detection element for detecting rotation of the steering driving motor 127 may be connected to the steering driving motor 127. The wake-up circuit 300 may wake up the lower ECU 129 by operating based on the change in current consumption of the motor rotation detection element connected to the steering driving motor 127 in the vehicle ignition-off state.

The woken lower ECU 129 may generate a reaction torque command signal which suppresses forced rotation of the steering driving motor, and apply reaction torque to the steering driving motor 127 based on the reaction torque command signal.

That is, the woken-up upper ECU 119 or lower ECU 129 may provide reaction torque to suppress forced rotation to the reaction motor 117 or the steering driving motor 127.

In the case of a parked vehicle in the vehicle ignition-off state, the wheels may be steered due to abnormal changes in the parking space (parking tower, etc.) or a vehicle theft attempt.

In this case, the steering driving motor 127 linked to the wheel may be forced to rotate, and accordingly, the current consumption of the motor rotation detection element connected to the steering driving motor 127 may change, and the upper ECU 119 of the upper device or the lower ECU 129 of the lower device may wake up using this change in current consumption.

In addition, in the case that the steering wheel is forcibly rotated by an external force, the current consumption of the motor rotation detection element connected to the reaction motor 117 of the upper device 110 may change. Alternatively, in the case that the wheel is forcibly steered by an external force, the current consumption of the motor rotation detection element connected to the steering driving motor 127 of the lower device 120 may change.

Therefore, the control device according to an embodiment may wake up the upper ECU 119 or the lower ECU 129 by using the change in current consumption of the motor rotation detection element due to forced rotation of either the reaction motor 117 or the steering driving motor 127 of the SBW steering system, and may provide the reaction torque for suppressing forced rotation to the reaction motor 117 or the steering driving motor 127.

For example, if there is a great need to suppress the rotation of the steering wheel in a vehicle ignition-off state, the control device may wake up the upper ECU 119 using the change in current consumption of the motor rotation detection element due to forced rotation of either the reaction motor 117 or the steering driving motor 127 of the SBW steering system, and provide reaction torque which suppresses forced rotation to the reaction motor 117 linked to the steering wheel.

Alternatively, if there is a greater need to suppress random steering of the wheels in the vehicle ignition-off state, the control device may wake up the lower ECU 129 using the change in current consumption of the motor rotation detection element due to forced rotation of either the reaction motor 117 or the steering driving motor 127 of the SBW steering system, and provide the reaction torque for suppressing forced rotation to the steering driving motor 127 linked to the wheel.

It will be described an embodiment of the SBW steering system in more detail below with reference to FIG. 9.

Meanwhile, the steering controller 200 may include a regulator, an inverter, a gate driver and a micro-control unit, and the wake-up circuit 300 according to the embodiment may use the change in current consumption of the motor rotation detection element due to forced rotation of the motor to wake up the steering controller 200 by turning on the regulator included in the steering controller 200.

An example of the detailed configuration of the steering controller 200 will be described in more detail below with reference to FIG. 4.

Meanwhile, the reaction torque applied by the wake-up steering controller 200 to the motor 400 may be a torque which rotates the reaction motor in a direction opposite to the forced rotation direction of the motor 400.

That is, the steering controller 200, which is woken up by the forced rotation of the motor in the vehicle ignition-off state, may determines the reaction torque for suppressing the forced rotation of the motor, generate a command current corresponding to the reaction torque, and supply the command current to the windings of the motor.

The magnitude of the reaction torque may be proportional to the rotation torque caused by forced rotation of the motor, and the direction of the reaction torque may be opposite to the direction of the rotation torque caused by forced rotation of the motor. For example, the magnitude of the reaction torque may be determined to be proportional to the magnitude of the back electromotive force generated by forced rotation of the steering wheel.

As a result, it is possible to suppress the rotation of the steering wheel or the steering of the vehicle wheel due to external force in the vehicle ignition-off state.

Additionally, the steering controller may be turned off or may enter a sleep mode after providing the reaction torque to the motor for a specific holding time after being woken up.

In this case, the holding time may be set to a time period of 2 to 5 seconds.

The holding time may also be expressed as a latch-off delay time.

In order to provide the holding time, the steering controller 200 may include a separate latch-off circuit or delay circuit.

By using the holding time, it is possible to further ensure stability by providing reaction torque to the motor and preventing rotation of the steering wheel only for a specific period of time, even if the back electromotive force disappears after the steering controller wakes up.

Figure 4:
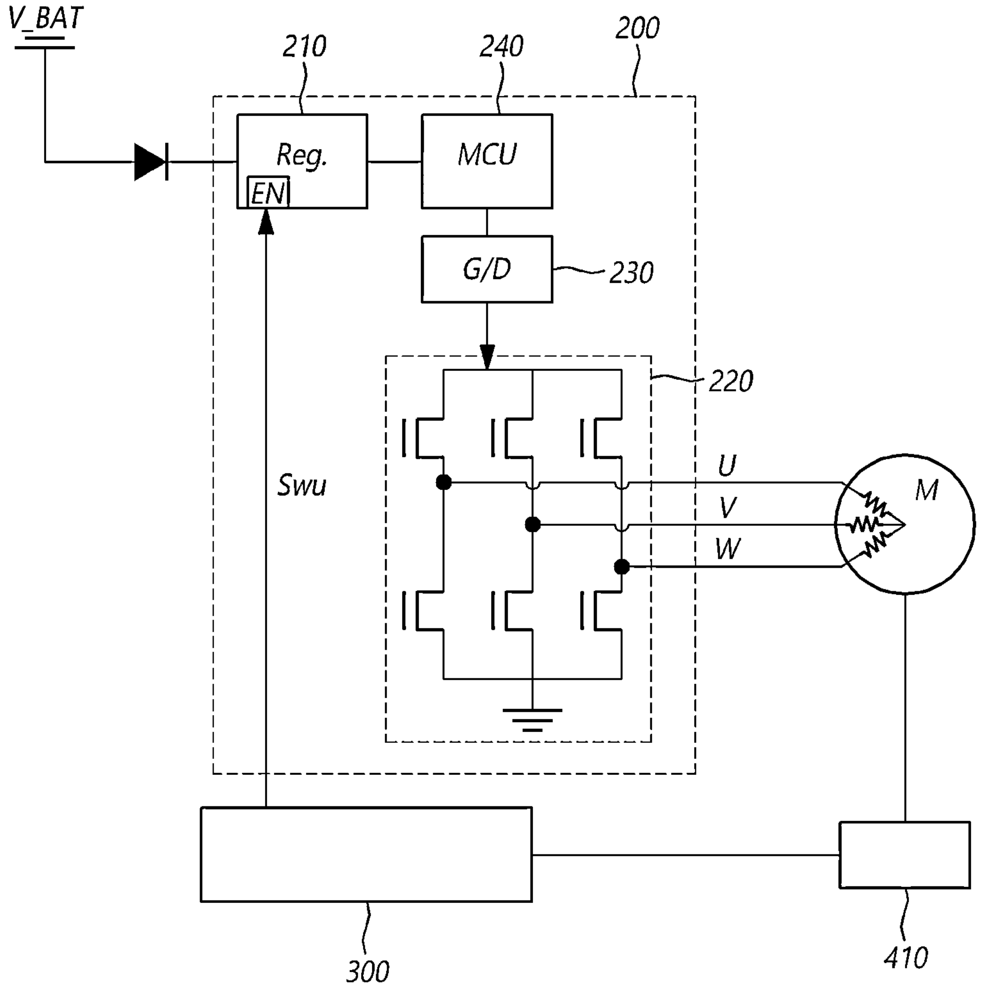
FIG. 4 illustrates an example of the detailed configuration of a steering control device according to an embodiment.

FIG. 4 illustrates an example of the detailed configuration of a steering control device according to an embodiment.

The steering control device according to an embodiment may include a steering controller 200 for controlling the rotation of a motor 400 linked to a steering wheel, and a wake-up circuit 300 for waking up the steering controller 200 using the change in current consumption of a motor rotation detection element 410 caused by forced rotation of the motor in the vehicle ignition-off state. In this case, the steering controller 200 may apply a reaction torque to the motor to suppress forced rotation of the motor after waking up.

Referring to FIG. 4, the steering controller 200 included in the steering control device according to an embodiment may be expressed as an ECU, and may include a regulation 210, an inverter 220, a gate driver 230, and a micro-control unit (MCU) 240.

The regulator 210 may receive a battery voltage V_BAT from a vehicle power supply, regulate the battery voltage to output a driving voltage for driving the MCU 440.

The regulator 210 may include an enable terminal EN through which an enable signal for enabling the regulator is input.

The inverter 220 may perform the function of supplying control current to the winding included in the motor 400.

The inverter 220 may convert the battery voltage V_BAT of a battery as a vehicle power supply, which is direct current (DC) or a driving voltage of the direct current output from the regulator 210 into alternating current (AC), and may apply the converted alternating current voltage (or alternating current) to the motor 400.

As an example, in the case that the motor is a reaction motor (117 in FIG. 2) included in the upper device of the SBW steering system and the vehicle is in a driving state, the inverter 220 may apply a driving current capable of providing a reaction torque to be applied to the steering wheel to the motor 400 in order to rotate the steering wheel in response to steering of the wheel by the lower device.

The inverter may be controlled by the gate driver 230, which will be described below, and the gate driver 230 may be controlled by the MCU 240.

Meanwhile, the motor 400 controlled by the steering control device according to an embodiment of the present disclosure may be a three-phase motor having u, v, and w phases.

In this case, as shown in FIG. 4, the inverter 220 may include a H-bridge circuit for supplying u-phase driving current, v-phase driving current, and w-phase driving current to the three-phase windings (u, v, w windings) of the motor 400, respectively.

The gate driver 230 may control the driving of the inverter 220.

Specifically, the gate driver 230 may input control signals to a gate terminals of the u, v, and w circuit switches included in the inverter 220 so as to control the inverter 220 to supply the u-phase driving current, the v-phase driving current and the w-phase driving current to the motor 400.

The MCU 240 may control the operation of the gate driver 230 with the driving voltage supplied from the regulator 210.

Specifically, the MCU 240 may generate a gate driver enable signal to activate the gate driver 230 and supply the gate driver enable signal to the gate driver 230.

As a result, in a normal driving state of a vehicle, the MCU 240 may generate a control signal capable of generating a reaction torque corresponding to wheel steering by the lower device of the SBW steering system and transmit the control signal to the gate driver 230. The gate driver 230 may control the inverter 220 to supply the driving current for the reaction torque corresponding to the control signal to the motor 400.

Meanwhile, if the vehicle ignition is off, the battery voltage V_BAT may not be supplied to the regulator 210, so the steering controller 200 is turned off.

In this case, the three-phase winding of the motor 400 may be in a floating state, and thus the rotor of the motor 400 may rotate freely by external force. Accordingly, the steering wheel linked to the motor 400 may also rotate freely, which may deteriorate vehicle stability.

Therefore, the steering control device according to the embodiment of the present disclosure may wake up the steering controller 200 in the vehicle ignition-off state and apply a reaction torque to the motor to suppress rotation of the motor due to external force, thereby preventing the rotation of the steering wheel or the random steering of the vehicle wheel.

Specifically, the wake-up circuit 300 may wake up the steering controller 200, which is in an off state or sleep state, by using the change in current consumption of a motor rotation detection element due to the forced rotation of the motor by an external force.

The awakened steering controller 200 may apply a reaction torque for suppressing forced rotation of the motor to the motor.

Hereinafter, there will be described the wake-up circuit 300 and the wake-up operation of the steering controller using the wake-up circuit.

The wake-up circuit 300 may include a switching element which turns on according to a change in current consumption of the motor rotation detection element 410 and one or more resistance elements.

The switching element included in the wake-up circuit 300 may be turned on when the consumption current of the motor rotation detection element 410 changes from a first consumption current to a second consumption current, and may generate a wake-up signal Swu for enabling the regulator 210 included in the steering controller 200 and input the wake-up signal Swu to an enable terminal EN of the regulator 210.

It will be described an example of the detailed configuration of the wake-up circuit 300 in more detail below with reference to FIGS. 5 to 8.

Figure 5:
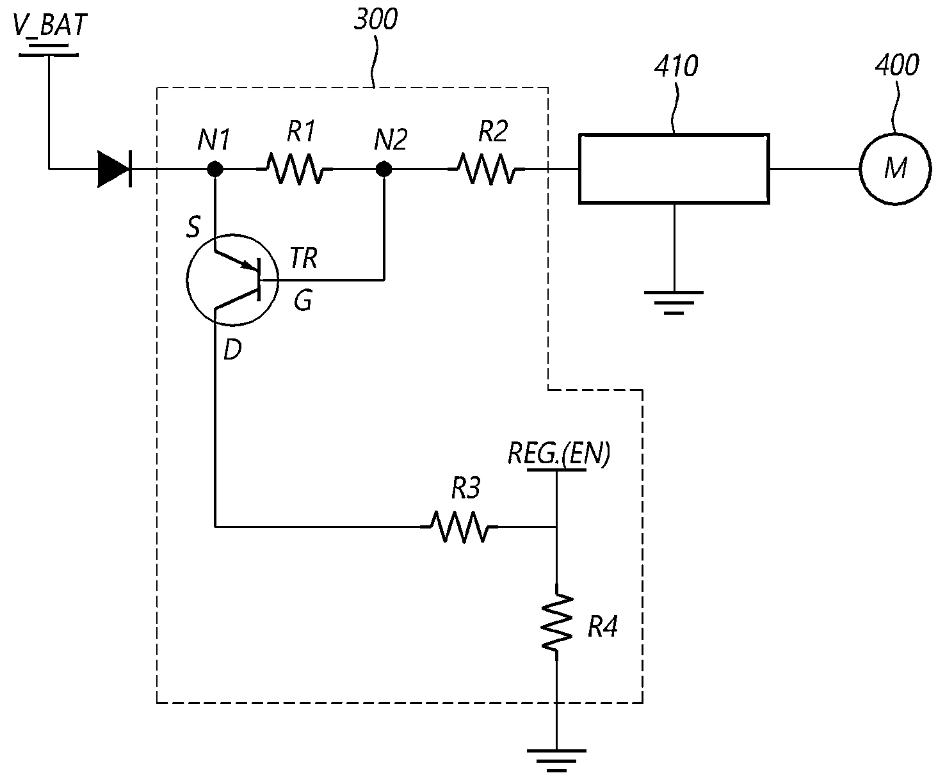
FIG. 5 illustrates an example of a wake-up circuit according to an embodiment.

FIG. 5 illustrates an example of a wake-up circuit according to an embodiment.

As an example, as shown in FIG. 4, the wake-up circuit 300 may include a first resistor R1 connected to the power supply V_BAT of the vehicle, and a second resistor R2 connected between the first resistor R1 and a motor rotation detection element 410.

In addition, the wake-up circuit 300 may include a switching element TR having a source terminal (S) connected to a first node N1 between the power supply and the first resistor R1, a gate terminal (G) connected to a second node N2 between the first resistor R1 and the second resistor R2, and a drain terminal (D) connected to the steering controller 200.

The switching element TR may be a PNP type transistor or a P-channel type field effect transistor (FET), but is not limited thereto.

A current of a specific magnitude may flow between the motor rotation detection element 410 and the wake-up circuit 300. In other words, in the case that the motor is rotating or not rotating, the motor rotation detection element may consume a specific amount of current, which can be expressed as the consumption current or the current consumption.

For example, if an external force is not applied in the vehicle ignition-off state, the motor 400 does not rotate, and in this case, the motor rotation detection element 410 may consume a first consumption current.

Meanwhile, in the vehicle ignition-off state, if the steering wheel forcibly rotates or the vehicle wheel is forcibly steered by an external force, the motor 400 may be forced to rotate, and in the case, a second consumption current may flow in the motor rotation detection element 410.

In this case, the first consumption current and the second consumption current may be determined according to the specifications of the motor rotation detection element 410.

For example, the first current consumption may have a value of about tens to hundreds of μA, and the second current consumption may have a value of about 4 to 10 mA.

In addition, the first resistor R1 and the second resistor R2 may each have a resistance value of hundreds of ohms (Ω), but are not limited thereto. For example, the first resistor R1 and the second resistor R2 may have a resistance value of about 150Ω.

As the motor is forced to rotate, a second consumption current may flow between the motor rotation detection element 410 and the wake-up circuit 300, and accordingly, the potential difference or the voltage difference between both ends of the first resistor R1 may be greater than a turn-on threshold voltage of the switching element TR or a gate-source threshold voltage of the switching element TR.

Accordingly, the switching element TR may be turned on, and the battery voltage V_BAT of the power supply may be output through the drain terminal D of the switching element.

Accordingly, a high-level wake-up signal Swu may be transmitted from the drain terminal (D) of the switching element TR to an enable terminal of the regulator 210 included in the steering controller 200.

In addition, as shown in FIG. 5, the wake-up circuit 300 may further include a third resistor R3 disposed between the switching element TR and the steering controller 200.

Specifically, as shown in FIG. 5, the third resistor R3 may be disposed between the drain terminal (D) of the switching element TR and the enable terminal EN of the regulator 210.

The third resistor R3 may be configured to allow a wake-up current due to the battery voltage V_BAT of the power supply to flow to the enable terminal of the regulator 210 if the switching element TR is turned on by the second consumption current.

In addition, the wake-up circuit 300 may further include a fourth resistor R4 connected between one end of the third resistor R1 or the steering controller 200 and ground.

Specifically, as shown in FIG. 5, the fourth resistor R4 may be connected between the enable terminal EN of the regulator 210 or one end of the third resistor and ground.

The fourth resistor R4 may prevent the enable terminal EN from floating, thereby allowing the wake-up signal Swu to be stably applied to the enable terminal EN.

Figure 6:
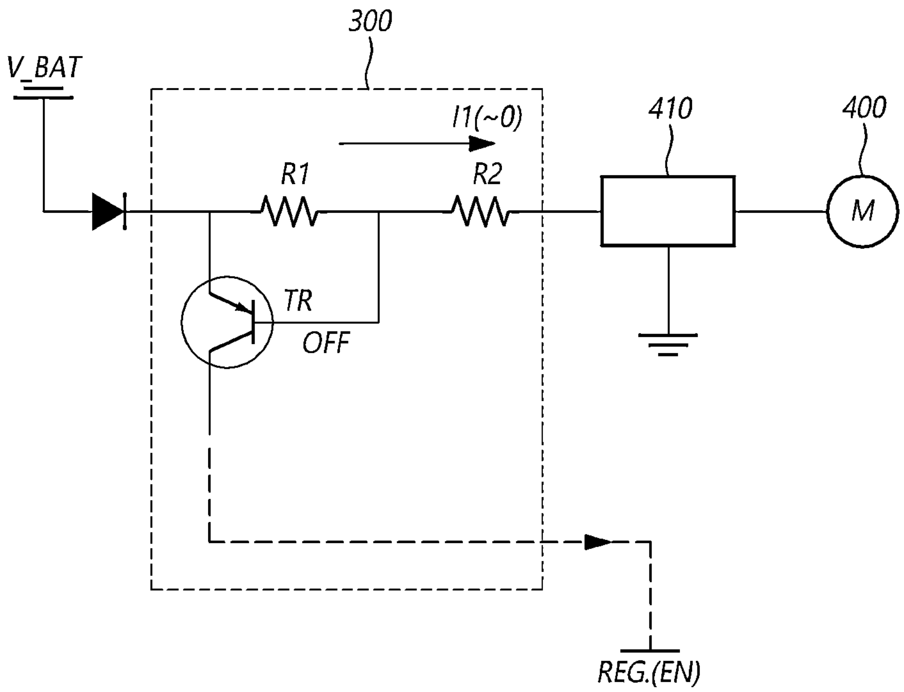
FIG. 6 illustrates an operating state of the wake-up circuit in the case that a motor does not rotate.

FIG. 6 illustrates an operating state of the wake-up circuit in the case that a motor does not rotate.

Hereinafter, it is assumed that the resistance values of the first resistor R1 and the second resistor R2 are each 150Ω.

As shown in FIG. 6, if there is no external force in the vehicle ignition-off state, the motor 400 does not rotate. In this case, a first consumption current I1 may flow through the motor rotation detection element 410.

That is, if the motor is not rotating, a first consumption current I1 flows between the motor rotation detection element 410 and the wake-up circuit 300, and the first consumption current may have a value in the range of tens of ρA to hundreds of ρA.

As an example, the first consumption current I1 may be about 100 μA.

In this case, the gate-source voltage Vgs, which is the voltage between the gate terminal (G) and the source terminal (S) of the switching element (TR), is only several tens of mV, and the switching element TR may be not turned on by this gate-source voltage value.

That is, in a state in which the first consumption current flows, the gate-source voltage Vgs of the switching element TR is less than the turn-on threshold voltage or the gate-source threshold voltage of the switching element TR, and therefore the switching element TR may be in an OFF state.

As an example, in the case that the first consumption current I1 is 100 μA and the resistance value of the first resistor R1 is 150Ω, the gate-source voltage Vgs of the switching element TR may be about 15 mV, and the switching element TR may be maintained in the OFF state by this gate-source voltage value.

Accordingly, the battery voltage V_BAT of the power supply is blocked, and current does not flow to the regulation 210 of the steering controller 200, so a signal is not supplied to the enable terminal of the regulation 210.

Accordingly, the steering controller 200 may be maintained in the OFF state or a sleep mode state, which is the default state in the vehicle ignition-off state.

Figure 7:
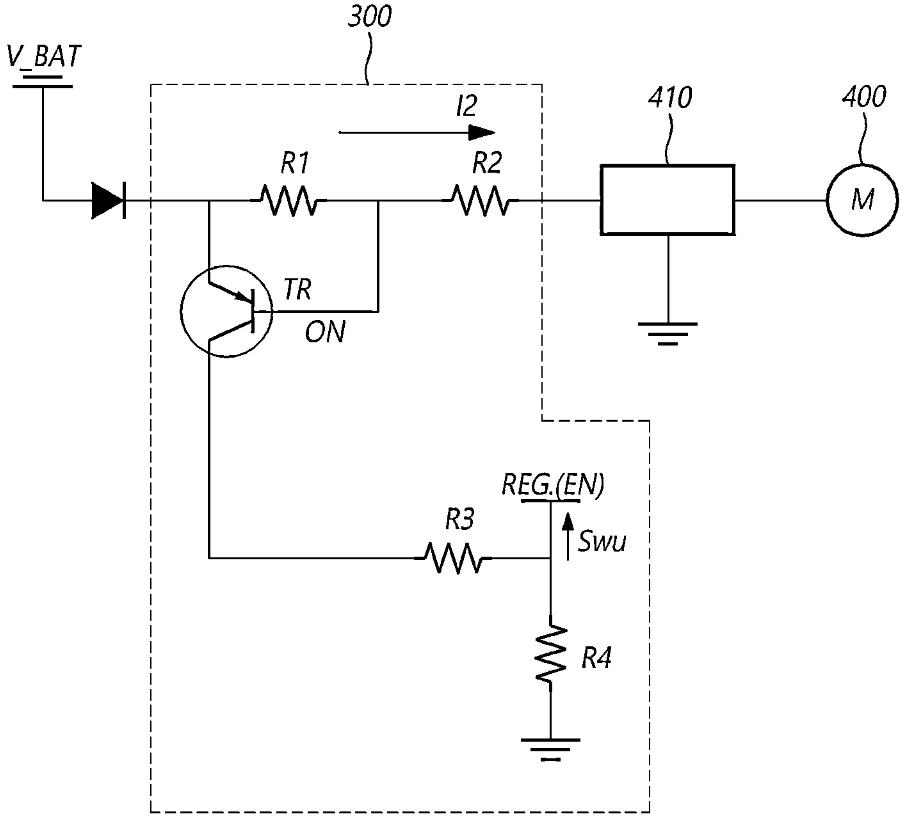
FIG. 7 illustrates an operating state of the wake-up circuit in the case that the current consumption of a motor rotation detection element changes due to forced rotation of a motor.

FIG. 7 illustrates an operating state of the wake-up circuit in the case that the current consumption of a motor rotation detection element changes due to forced rotation of a motor.

Referring to FIG. 7, if the motor 400 is forced to rotate by an external force while the vehicle ignition is off, the motor rotation detection element 410 may use a second consumption current I2 to detect the forced rotation of the motor.

That is, if the motor is forced to rotate, the second consumption current I2 may flow between the motor rotation detection element 410 and the wake-up circuit 300.

Since the resistance values of the first resistor R1 and the second resistor R2 are each 150Ω, and the second consumption current has a value of about 4 to 10 mA, a voltage of approximately 0.6V to 1.5V may be applied between the first resistor R1.

Accordingly, the gate-source voltage Vgs, which is the voltage between the gate terminal (G) and the source terminal (S) of the switching element TR, may be about 0.6V to 1.5V.

This gate-source voltage of 0.6V to 1.5V may be greater than the turn-on threshold voltage or the gate-source threshold voltage of the switching element TR.

For example, if the second consumption current I2 is 5 mA and the first resistor R1 and the second resistor (R2) are each 150Ω, the gate-source voltage Vgs of the switching element TR may be about 0.75V.

This gate-source voltage of 0.75V may be greater than the turn-on threshold voltage or the gate-source threshold voltage of the switching element TR, and therefore the switching element TR may be turned on.

As the switching element TR is turned on, the battery voltage V_BAT of the power supply may be output from the wake-up circuit 300.

That is, a driving current may flow through the third resistor R3 by the battery voltage V_BAT, and the wake-up signal Swu may be applied to the steering controller 200 accordingly.

Specifically, a high-level wake-up signal Swu may be applied to the enable terminal EN of the regulator 210 included in the steering controller.

Accordingly, the regulator 210 may be turned on, and as shown in FIG. 4, power from an external power supply may be supplied to the MCU 240 and the steering controller 200 may be woken up.

After waking up, the steering controller 200 may determine a non-driving state of a vehicle based on vehicle status information I_state received from a sensor, etc.

In this case, the steering controller 200 may apply a reaction torque opposing the external force which causes forced rotation of the motor to the motor only when it is determined that the vehicle is in the non-driving state.

As a result, even if forced rotation of the motor is attempted by an external force in the vehicle ignition-off state, there may be prevented the arbitrary rotation of the steering wheel or arbitrary steering of the wheels.

Figure 8:
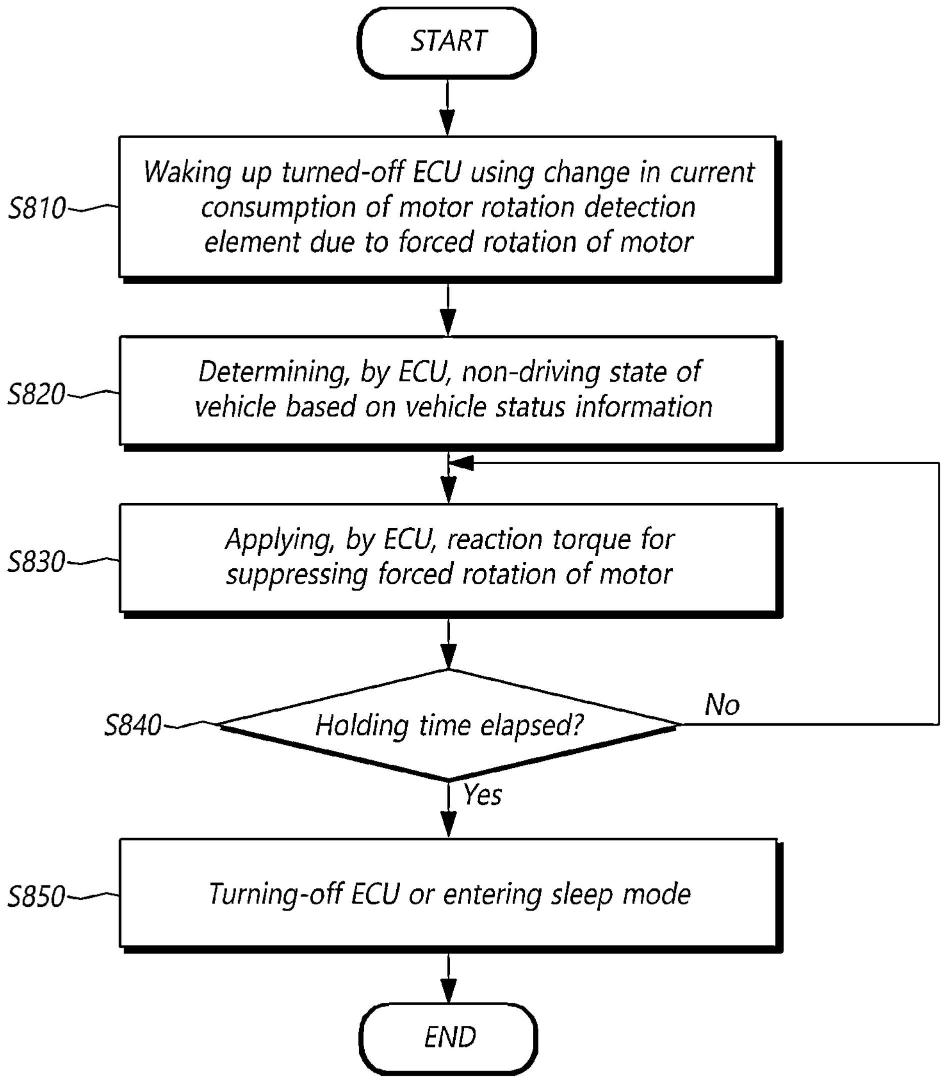
FIG. 8 illustrates a flowchart of a control method of an electric steering system according to an embodiment of the present disclosure.

FIG. 8 illustrates a flowchart of a control method of an electric steering system according to an embodiment of the present disclosure.

Referring to FIG. 8, a control method of the electric steering system according to an embodiment may include a step S810 in which the wake-up circuit wakes up the steering controller using the change in current consumption of a motor rotation detection element caused by forced rotation of the motor linked to the steering wheel or wheel by external force, and a step S830 in which the awakened steering controller generates a reaction torque for suppressing forced rotation of the motor and applies the reaction torque to the motor.

In addition, the control method of the electric steering system according to an embodiment may further include a step S820 in which the awakened steering controller determines a non-driving state of the vehicle based on vehicle status information received from the sensor.

In this case, if it is determined in step S820 that the vehicle is in the non-driving state, there may be performed a step S830 of applying the reaction torque to the motor.

The vehicle status information may be one or more of vehicle ignition information, vehicle speed information, vehicle door lock information, vehicle door open information, driver boarding information, seat belt fastening information, and theft alarm function activation information.

The wake-up circuit for performing the step S910 of waking up the steering controller may include a first resistor connected to a power supply, a second resistor connected between the first resistor and the motor rotation detection element, and a switching element having a source terminal connected to a first node between the power supply and the first resistor, a gate terminal connected to a second node between the first resistor and the second resistor, and a drain terminal connected to the steering controller.

Therefore, in the step S810 of waking up the steering controller, the switching element may be turned on by the second consumption current applied to the motor rotation detection element, and accordingly, a high-level wake-up signal Swu may be applied to the steering controller by a battery voltage V_BAT of a power supply.

Specifically, the steering controller 200 may include a regulator 210 which regulates the voltage from the power supply, and the high-level wake-up signal Swu may be transmitted to the enable terminal EN of the regulator to wake up the steering controller.

In addition, in the step S830 of applying a reaction torque to the motor, the wake-up steering controller may provide the reaction torque to the motor for a specific holding time and then turn off or enter a sleep mode (S840, S850).

In this case, the holding time may be expressed as a latch-off delay time, and may be set to a time period of about 2 to 5 seconds.

Meanwhile, the electric steering system to which the method according to this embodiment is applied may be an SBW steering system.

That is, the electric steering system or the electric power steering system may include an upper device including a reaction motor linked to the steering wheel, and a lower device mechanically separated from the upper device and including a steering driving motor linked to the wheel. The motor linked to the steering wheel may be the reaction motor included in the upper device.

Meanwhile, according to an embodiment of the present disclosure, there may provide an electric steering system including a motor linked to the steering wheel of a vehicle or a vehicle wheel, a steering controller for controlling rotation of the motor, and a wake-up circuit which wakes up the steering controller using the change in current consumption of the motor rotation detection element caused by forced rotation of the motor due to external force in the vehicle ignition-off state.

In this case, the steering controller may apply a reaction torque to the motor to suppress forced rotation of the motor after waking up.

Since the specific configuration of the steering controller and wake-up circuit included in the electric steering system may correspond to the configuration of the control device of the electric steering system described above, there is omitted description to avoid duplication.

However, the electric steering system to which embodiments of the present disclosure are applied may be an SBW steering system including an upper device including a reaction motor linked to the steering wheel, and a lower device which is mechanically separated from the upper device and includes a steering driving motor linked to the wheel, which will be described in more detail below.

Figure 9:
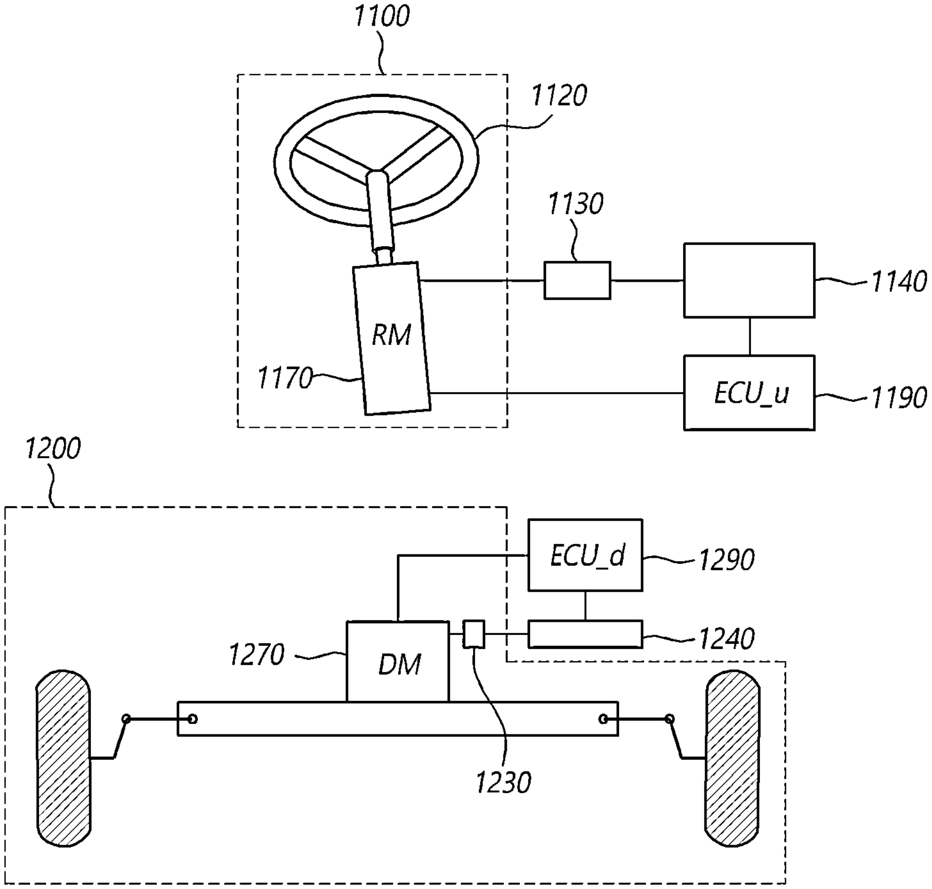
FIG. 9 illustrates the configuration of an SBW steering system, which is an example of an electric steering system according to an embodiment of the present disclosure.

FIG. 9 illustrates the configuration of an SBW steering system, which is an example of an electric steering system according to an embodiment of the present disclosure.

Referring to FIG. 9, the electric steering system according to an embodiment may be a steer-by-wire steering system including an upper device 1100 which includes a reaction motor 1170 linked to a steering wheel 1120, and a lower device 1200 which is mechanically separated from the upper device and includes a steering driving motor 1270 linked to the wheel of the vehicle.

The detailed configuration of the upper device 1100 and the lower device 1200 may correspond to the configuration described in FIG. 2.

The reaction motor 1170 of the upper device 1100 may provide a steering reaction torque to the steering wheel according to the steering of the wheel by the lower device 1200. The steering reaction torque is used to rotate the steering wheel so as for the driver to feel the degree of steering of the wheels.

The upper device 1100 may include an upper ECU 1190 for controlling the reaction motor 1170 and an upper motor rotation detection element 1130 for detecting the rotation of the reaction motor 1170, and the upper ECU may be a steering controller according to the embodiment of the present disclosure.

A wake-up circuit 1140 may be connected to the upper ECU 1190.

The wake-up circuit 1140 may use the change in current consumption of the upper motor rotation detection element 1130 which occurs when the reaction motor 1170 is forced to rotate due to an external force in the vehicle ignition-off state to wake up the upper ECU 1190.

Specifically, if the reaction motor 1170 is forced to rotate due to an external force, the wake-up circuit 1140 may operate by the second consumption current flowing through the upper motor rotation detection element 1130. The wake-up circuit 1140 generates a high-level wake-up signal and applies the wake-up signal to the upper ECU 1190, thereby waking up the upper ECU 1190.

The upper ECU 1190 may prevent forced rotation of the steering wheel by applying a reaction torque which suppresses forced rotation of the reaction motor 1170 to the motor after waking up.

As an example, the wake-up circuit 1140 may include, as described in FIGS. 5 to 7, a first resistor R1 connected to a power supply, a second resistor R2 connected between the first resistor R1 and the upper motor rotation detection element 1130, and a switching element TR including a source terminal connected to a first node between the power supply and the first resistor, a gate terminal connected to a second node between the first and second resistors, and a drain terminal connected to the steering controller.

The upper ECU 1190 may include, as the steering controller 200 shown in FIG. 4, a regulator for regulating the voltage from the power supply and an inverter for supplying control current to the winding included in the reaction motor 1170, a gate driver for controlling the operation of the inverter, and a micro-control unit (MCU) for controlling the operation of the gate driver with a driving voltage supplied from the regulator.

In addition, the upper ECU 1190 may, after being woken up by the wake-up circuit 1140, determine the non-driving state of the vehicle based on vehicle status information received from the sensor, and may apply the reaction torque to the reaction force motor 1170 only in the non-driving state of the vehicle.

In this case, the vehicle status information may be one or more of vehicle ignition information, vehicle speed information, vehicle door lock information, vehicle door open information, driver boarding information, seat belt fastening information, and theft alarm function activation information.

After waking up, the upper ECU 1190 may provide the reaction torque to the reaction force motor 1170 for a specific holding time, and then may be turned off or enter a sleep mode.

In the above, it has been described an example in which the embodiment is applied to the upper device of the SBW steering system, but the present disclosure is not limited thereto.

As an example, the control device according to an embodiment may be applied to the lower device 1200 or both the upper device 1100 and the lower device 1200 of the SBW steering system shown in FIG. 10.

The lower device 1200 may further include a wake-up circuit 1240 connected to a lower ECU 1290 and a lower motor rotation detection element 1230 which detects rotation of the steering driving motor 1270.

In this case, the upper ECU 1190 or the lower ECU 1290 may be woken up by the change in current consumption of the lower motor rotation detection element 1230 which occurs when the steering driving motor 1270 is forced to rotate.

The woken up upper ECU 1190 or lower ECU 1290 may provide reaction torque to suppress forced rotation to the reaction motor 1170 or the steering driving motor 1270.

In a vehicle ignition-off state, the steering wheel may be forcibly rotated or the wheels may be forcibly steered by an external force.

In this case, the reaction motor 1170 linked to the steering wheel or the steering driving motor 1270 linked to the wheel may be forced to rotate. Accordingly, the current consumption of the motor rotation detection elements 1130 and 1230 connected to the reaction motor 1170 or the steering driving motor 1270 may change from a first consumption current to a second consumption current.

Therefore, in the same manner as described above, the wake-up circuit 1140 of the upper device or the wake-up circuit 1240 of the lower device may wake up the upper ECU 1190 of the upper device or the lower ECU 1290 of the lower device by using the change in current consumption of the motor rotation detection elements 1130 and 1230 connected to the reaction motor 1170 or the steering driving motor 1270.

That is, in the case that the steering wheel is forced to rotate due to an external force, the current consumption of the upper motor rotation detection element 1130 connected to the reaction motor 1170 of the upper device 1100 may change, and if the vehicle wheels are forcibly steered by an external force, the current consumption of the lower motor rotation detection element 1230 connected to the steering driving motor 1270 of the lower device 1200 may change.

Therefore, the control device according to an embodiment may wake up the upper ECU 1190 or lower ECU 1290 using the change in current consumption of the motor rotation detection element due to the forced rotation of the reaction motors 1170 or the steering driving motor 1270 of the SBW steering system, and may provide reaction torque to suppress forced rotation to the reaction motor 1170 or the steering driving motor 1270.

For example, if there is a greater need to suppress the rotation of the steering wheel in the vehicle ignition-off state, the control device may wake up the upper ECU 1190 using the change in current consumption of the motor rotation detection element due to the forced rotation of the reaction motors 1170 or the steering driving motor 1270 of the SBW steering system, and may provide reaction torque for suppressing the forced rotation to the reaction motor 1170 linked to the steering wheel.

Alternatively, if there is a greater need to suppress steering of the wheels in the vehicle ignition-off state, the control device may wake up the lower ECU 1290 using the change in current consumption of the motor rotation detection element due to the forced rotation of the reaction motors 1170 or the steering driving motor 1270 of the SBW steering system, and may provide reaction torque for suppressing the forced rotation to the steering driving motor 1270 linked to the vehicle wheel.

As described above, the embodiment of the present disclosure may be applied to the SBW steering system and may selectively prevent forced rotation of the steering wheel by external force or forced steering of the vehicle wheel by external force.

In addition, according to embodiments of the present disclosure, it is possible to suppress the rotation of the steering wheel or arbitrary steering of the wheels by using the change in current consumption of the motor rotation detection element caused by the forced rotation of the motor included in the electric steering system in a vehicle ignition-off state.

In addition, according to embodiments of the present disclosure, it is possible to wake up the electronic controller using the change in current consumption of the motor rotation detection element caused by the forced rotation of the motor included in the electric steering system, and provide the reaction force to the motor by the electronic control unit, thereby suppressing the rotation of the steering wheel or preventing arbitrary steering of the wheels.

Accordingly, according to embodiments of the present disclosure, it is possible to prevent theft of a vehicle in the ignition-off state and maintain the stability of the vehicle while using a simple device with low power consumption.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s). Further, each of the configurations or elements included in one or more of the embodiments may be implemented by an independent hardware configuration; however, some or all of the configurations or elements may be selectively combined and implemented by one or more computer program(s) having one or more program module(s) that perform some or all functions from one or more combined hardware configuration(s). Codes or code segments constituting the computer program(s) may be easily produced by those skilled in the art. As the computer programs stored in computer-readable media are read and executed by a computer, embodiments of the present disclosure can be implemented. The media for storing computer programs may include, for example, a magnetic storing medium, an optical recording medium, and a carrier wave medium.

Further, unless otherwise specified herein, terms ‘include’, ‘comprise’, ‘constitute’, ‘have’, and the like described herein mean that one or more other configurations or elements may be further included in a corresponding configuration or element. Unless otherwise defined herein, all the terms used herein including technical and scientific terms have the same meaning as those understood by those skilled in the art. The terms generally used such as those defined in dictionaries should be construed as being the same as the meanings in the context of the related art and should not be construed as being ideal or excessively formal meanings, unless otherwise defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A device for controlling an electric power steering system, the device comprising:

a steering controller configured to control a motor operably connected to a steering wheel or a wheel of a vehicle; and a wake-up circuit configured to, in an ignition-off state of the vehicle, wake up the steering controller using a change in current consumption of a motor rotation detector associated with rotation of the motor caused by external force;

wherein the steering controller is configured to, after being woken up, control to apply a reaction torque to the motor to suppress the rotation of the motor caused by the external force, and wherein the motor rotation detector is configured to generate a first consumption current in response to non-rotation of the motor, and generate a second consumption current greater than the first consumption current in response to the rotation of the motor.

2. The device of claim 1, wherein the wake-up circuit comprises one or more switch elements and one or more resistor elements connected between a power supply and the motor rotation detector.

3. The device of claim 2, wherein:

the one or more resistor elements comprise a first resistor connected to the power supply and a second resistor connected between the first resistor and the motor rotation detector, the switch element comprises a source terminal connected to a first node between the power supply and the first resistor, a gate terminal connected to a second node between the first resistor and the second resistor, and a drain terminal connected to the steering controller.

4. The device of claim 3, wherein the wake-up circuit is configured such that, in response to the second consumption current, a voltage difference between both ends of the first resistor is greater than a turn-on threshold voltage of the switch element.

5. The device of claim 4, wherein the steering controller comprises:

a regulator configured to regulate a voltage from the power supply;

an inverter configured to supply control current to windings of the motor;

a gate driver configured to control the inverter; and a micro-control unit (MCU) configured to be driven by a driving voltage supplied from the regulator and control the gate driver.

6. The device of claim 5, wherein the switch element is configured such that, in response to the second consumption current, a wake-up signal is transmitted from the drain terminal of the switch element to an enable terminal of the regulator.

7. The device of claim 3, wherein the resistor element further includes a third resistor connected between the drain terminal of the switch element and the enable terminal of the regulator, and a fourth resistor connected between the enable terminal and one end of the third resistor and ground.

8. The device of claim 1, wherein the steering controller is configured to, after being woken up, determine whether the vehicle is a non-driving state based on vehicle status information received from a sensor, and control to apply the reaction torque to the motor only when the vehicle is in the non-driving state.

9. The device of claim 8, wherein the vehicle status information comprises at least one of vehicle ignition information, vehicle speed information, vehicle door lock information, vehicle door open information, driver boarding information, seat belt fastening information, or theft alarm function activation information.

10. The device of claim 1, wherein:

the motor is a reaction motor connected to the steering wheel, and the electric power steering system includes a steer-by-wire steering system which comprises an upper device including the reaction motor connected to the steering wheel, and a lower device not mechanically connected to the upper device and including a steering driving motor connected to the wheel of the vehicle.

11. The device of claim 1, wherein the steering controller is configured to, after being woken up, control to provide the reaction torque to the motor for a holding time, and then turn off or enter a sleep mode after the holding time.

12. The device of claim 1, wherein the motor rotation detector comprises a motor position sensor connected to the motor and configured to detect a rotation speed of a rotor of the motor.

13. A method for controlling an electric power steering system, the method comprising:

in an ignition-off state of a vehicle, waking up, by a wake-up circuit, a steering controller using a change in current consumption of a motor rotation detector associated with rotation of a motor caused by external force, wherein the motor is connected to a steering wheel or a wheel of the vehicle; and after the steering stroller is woken up by the wake-up circuit, controlling, by the steering controller, to apply a reaction torque to the motor to suppress the rotation of the motor caused by the external force, wherein the motor rotation detector generates a first consumption current if the motor is not rotating, and generates a second consumption current greater than the first consumption current when the motor is rotating.

14. The method of claim 13, wherein the wake-up circuit comprises:

a first resistor connected to a power supply and a second resistor connected between the first resistor and the motor rotation detector; and a switch element including a source terminal connected to a first node between the power supply and the first resistor, a gate terminal connected to a second node between the first resistor and the second resistor, and a drain terminal connected to the steering controller.

15. The method of claim 14, wherein the steering controller comprises:

a regulator configured to regulate a voltage from the power supply;

an inverter configured to supply control current to windings of the motor;

a gate driver configured to control the inverter; and a micro-control unit (MCU) configured to be driven by a driving voltage supplied from the regulator and control the gate driver.

16. The method of claim 15, wherein the waking up of the steering controller comprises, if the second consumption current is generated by the motor rotation detector, transmitting a wake-up signal from the drain terminal of the switch element to an enable terminal of the regulator.

17. The method of claim 13, further comprising, after the steering stroller is woken up by the wake-up circuit, determining, by the steering controller, whether the vehicle is in a non-driving state based on vehicle status information received from a sensor, wherein the controlling to apply the reaction torque comprises applying the reaction torque to the motor only when the vehicle is in the non-driving state.

18. The method of claim 13, wherein:

the motor is a reaction motor connected to the steering wheel, and the electric power steering system includes a steer-by-wire steering system which comprises an upper device including the reaction motor connected to the steering wheel, and a lower device not mechanically connected to the upper device and including a steering driving motor connected to the wheel of the vehicle.

* * * * *